United States Patent [19]
Guillermie et al.

[11] 3,876,935
[45] Apr. 8, 1975

[54] DEVICE FOR DETERMINING THE PRESENCE OF IMPURITIES IN OIL CONTAINED IN THE CRANK CASES OF ENGINES OR OTHER APPARATUS

[75] Inventors: Jean Pierre Guillermie; Germinal Gil, both of Billancourt, France

[73] Assignees: Regie Nationale des Usines Renault, Billancourt, Hauts de Seine; Automobiles Peugeot, Paris, both of, France

[22] Filed: Apr. 3, 1974

[21] Appl. No.: 457,332

Related U.S. Application Data

[63] Continuation of Ser. No. 313,793, Dec. 11, 1972, abandoned.

[30] Foreign Application Priority Data
Dec. 13, 1971   France ............................. 71.44701

[52] U.S. Cl. .............................. 324/65 R; 340/270
[51] Int. Cl. ............................................ G01r 27/02
[58] Field of Search ................ 324/65 R, 65 P, 270

[56] References Cited
UNITED STATES PATENTS

| | | | |
|---|---|---|---|
| 902,753 | 11/1908 | Marshall | 324/65 R X |
| 2,127,538 | 8/1938 | Seiger | 324/65 R X |
| 2,377,426 | 6/1945 | Kersten | 324/65 R X |
| 2,716,165 | 8/1955 | Pfitzner | 340/270 X |
| 2,735,907 | 2/1956 | Inman | 324/65 R X |
| 3,139,085 | 6/1964 | Custance et al. | 324/65 P |
| 3,422,417 | 1/1969 | Lowe | 340/270 |
| 3,670,319 | 6/1972 | Ohtani | 340/270 X |
| 3,710,237 | 1/1973 | Watson et al. | 324/65 R X |

*Primary Examiner*—Stanley T. Krawczewicz
*Attorney, Agent, or Firm*—Stevens, Davis, Miller & Mosher

[57] ABSTRACT

A device for determining the presence of impurities in oil contained in engine crank-cases or oil-sumps or any other apparatus, and comprising an electric probe sufficiently thin to be capable of passing into the crank-case through the orifice provided for the oil gauge, and an ohmmeter connected at the same time to the probe and to an indicator device. The device gives an indication of the quantity of impurities by direct measurement of the resistivity of the oil actually in the crank-case and without any need for the draining of samples.

4 Claims, 3 Drawing Figures

DEVICE FOR DETERMINING THE PRESENCE OF IMPURITIES IN OIL CONTAINED IN THE CRANK CASES OF ENGINES OR OTHER APPARATUS

This is a continuation of application Ser. No. 313,793, filed Dec. 11, 1972, now abandoned.

The present invention relates to a device which makes it possible to determine the presence of impurities in oil contained in the crank cases of engines or any other apparatus.

It is well known that when oil contains water or impurities, its lubrication and insulating properties are adversely affected.

The presence of impurities or foreign bodies in the oil in the dissolved state or in suspension, is accompanied by an increase in the resistivity, the measurement of which gives an indication of the quality of the oil.

Up to the present time, no device was available for measuring the resistivity of oil contained in a crank case or other closed receptacle not equipped with measuring probes. This measurement had to be made on samples of oil taken from the crank case or from drained oil. This is however a slow and not very practical measurement.

There has now been discovered a device which does not have these disadvantages, since it enables the measurement of resistivity to be made directly in the crank case, without having to make any prior draining operation.

This device essentially comprises an electric probe which is sufficiently thin to be able to pass through the orifice provided in the casing in order to introduce the oil gauge and an ohmmeter which is connected simultaneously to the probe and to an indicator box.

The probe is provided internally with a printed circuit. The detector mounted on the ohmmeter is designed to emit a signal at the moment the needle of the ohmmeter passes beyond a certain position, and this signal is sent to an indicator box.

The invention will also be illustrated by means of the description given below of one particular form of embodiment, given with reference to the accompanying drawings, in which.

Figure 1:
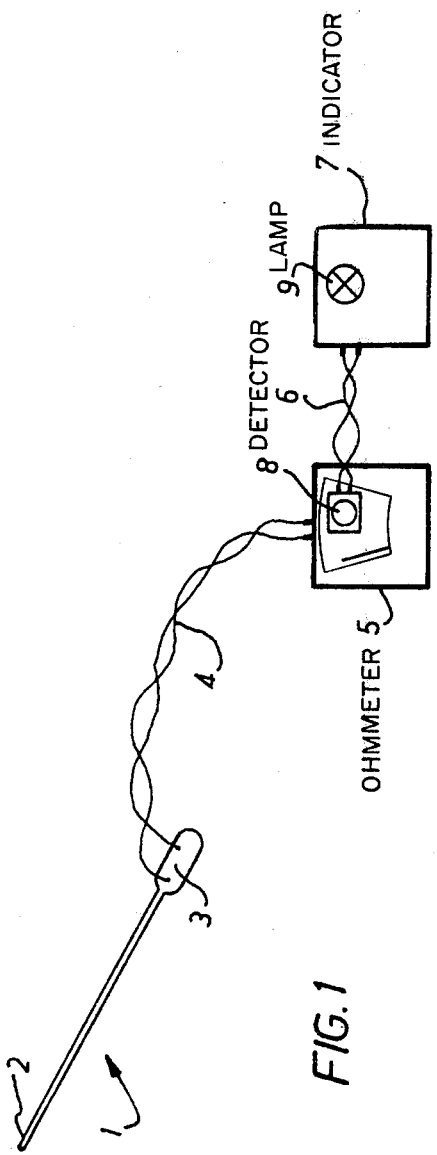
FIG. 1 represents a general view of the device.

As can be seen from FIG. 1, the probe 1 has a thin and flexible portion 2 and a wider portion 3. An electric cable 4 connects the electric circuit of the probe to an ohmmeter 5 which is in turn connected by a cord 6 to an indicator box 7. The ohmmeter comprises a detector 8 which sends a signal over the connection 6 as soon as the needle reaches a pre-determined value. The indicator box is equipped with a light indicator 9 which lights up as soon as a current passes.

Figure 2:
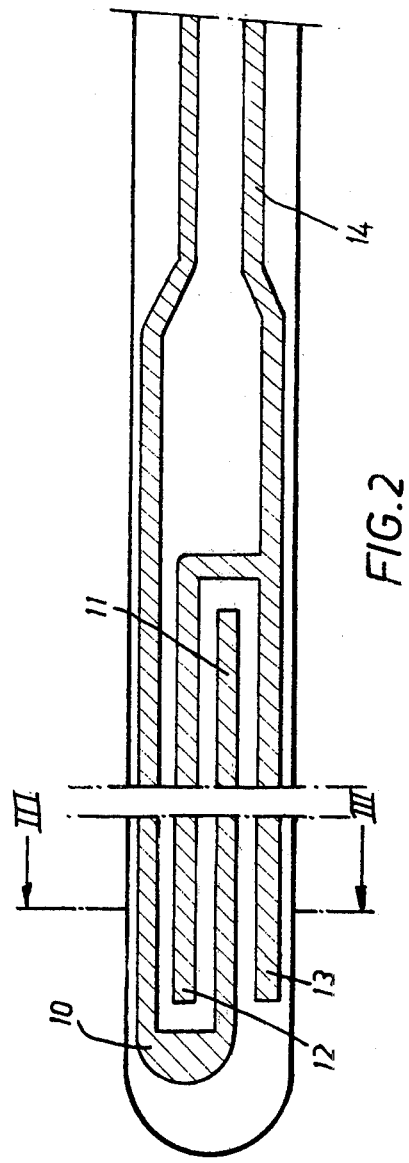
FIG. 2 shows the extremity of the probe in contact with the oil.
Figure 3:
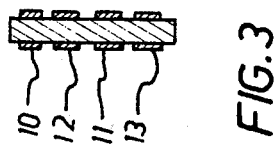
FIG. 3 represents a cross-section taken along the line III—III of FIG. 2.

It will be seen from FIG. 2 that the thin portion 2 of the probe comprises an interrupted printed circuit including an incurved portion 10, the extremity 11 of which is incorporated between the two arms 12 and 13 of a portion of the circuit 14.

By means of this device, the measurement of resistivity of an oil can be carried out in a simple and rapid manner, and it is only necessary to look at a light or other indicator in order to be informed immediately as to the quality of the oil.

In order to measure the proportion of impurities in the oil contained in an automobile engine crank-case or oil sump, the probe is introduced by its thin portion 2 through the gauge hole in the tank-case until the portion carrying the printed circuit is immersed in the oil, and the terminals of the circuit are connected to an electric current source.

If the oil causes a short-circuit between the arms 10–11 on the one hand and 12–13 on the other, this current passes through the ohmmeter 5, the needle of which causes the passage of a current when it is deflected by a pre-determined amount which is a function of the proportion of impurities in the oil, which causes the indicator lamp 9 to light up.

It will of course be understood that the form of embodiment of the device described above is not in any way limited, and that numerous modifications and variations may be made thereto by those skilled in the art without thereby departing from the spirit or from the scope of the present invention.

What we claim is:

1. In a vehicle having a crank case or oil sump and an oil gauge which sits in an orifice and extends into the crank case or oil sump, a method for determining the presence of impurities in oil contained in the crank case or oil sump, comprising:
    a. removing the oil gauge from the orifice;
    b. passing an electric probe through the orifice and into the crank case or oil sump;
    c. measuring the resistivity of the oil, and
    d. generating an alarm signal indicating the resistivity of the oil.

2. The method of claim 1 wherein the step of measuring comprises connecting an ohmmeter to the electric probe and the step of generating comprises connecting an indicator to the ohmmeter, said indicator providing the alarm signal.

3. The method of claim 2 wherein said ohmmeter includes a needle and a detector coupled to said needle, and the step of generating comprises producing an output signal from said detector when the needle passes beyond a certain position and transmitting said output signal to said indicator, said output signal activating said alarm signal.

4. The method of claim 3 wherein said electric probe is traversed longitudinally in its portion which contacts the oil by an interrupted printed circuit having an incurved extremity which is incorporated between arms of a portion of the circuit.

* * * * *